United States Patent
Iino et al.

(10) Patent No.: US 9,694,929 B2
(45) Date of Patent: Jul. 4, 2017

(54) FOAMED AND STRETCHED PLASTIC BOTTLE

(71) Applicant: TOYO SEIKAN GROUP HOLDINGS, LTD., Tokyo (JP)

(72) Inventors: Hiroki Iino, Kanagawa (JP); Kentarou Ichikawa, Kangawa (JP); Nobuhisa Koiso, Kanagawa (JP); Norio Akuzawa, Kanagawa (JP); Tetsuro Nomura, Kanagawa (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 14/395,660

(22) PCT Filed: Apr. 23, 2013

(86) PCT No.: PCT/JP2013/061916
§ 371 (c)(1),
(2) Date: Oct. 20, 2014

(87) PCT Pub. No.: WO2013/161813
PCT Pub. Date: Oct. 31, 2013

(65) Prior Publication Data
US 2015/0083737 A1    Mar. 26, 2015

(30) Foreign Application Priority Data

Apr. 23, 2012 (JP) .................................. 2012-098043
Apr. 23, 2012 (JP) .................................. 2012-098044

(51) Int. Cl.
B65D 1/40    (2006.01)
B65D 1/02    (2006.01)
(Continued)

(52) U.S. Cl.
CPC ............ B65D 1/0207 (2013.01); B29B 11/08 (2013.01); B65D 1/0223 (2013.01); B65D 1/40 (2013.01);
(Continued)

(58) Field of Classification Search
CPC ............ B65D 81/3837; B65D 81/3846; B65D 81/3839; B65D 1/40; B65D 1/0215;
(Continued)

(56) References Cited

U.S. PATENT DOCUMENTS 8,397,932 B2    3/2013  Ichikawa et al.
8,714,401 B2    5/2014  Ichikawa et al.
(Continued)

FOREIGN PATENT DOCUMENTS

CN    1295206    5/2001
CN    101223082    7/2008
(Continued)

OTHER PUBLICATIONS

U.S. Appl. No. 14/386,929 to Norio Akuzawa et al., filed Sep. 22, 2014.
(Continued)

*Primary Examiner* — Andrew Perreault
(74) *Attorney, Agent, or Firm* — Greenblum & Bernstein, P.L.C.

(57) ABSTRACT

A foamed and stretched plastic bottle having, in the body portion thereof, a foamed region in which foamed cells are distributed, wherein, in at least a portion of the foamed region, the lengths of the foamed cells in the axial direction of the bottle are so distributed as to gradually decrease as the positions of the foamed cells shift from the outer surface side of the body portion toward the central portion thereof and then gradually increase as their positions shift from the central portion thereof toward the inner surface side thereof.

(Continued)

The foamed and stretched plastic bottle of the invention exhibits excellent light-shielding property.

3 Claims, 7 Drawing Sheets

(51) Int. Cl.
*B29B 11/08* (2006.01)
*B65D 81/30* (2006.01)
*B29C 49/08* (2006.01)
*B29L 31/00* (2006.01)
*B29B 11/14* (2006.01)
*B29K 105/04* (2006.01)
*B29C 49/06* (2006.01)

(52) U.S. Cl.
CPC .............. *B65D 81/30* (2013.01); *B29B 11/14* (2013.01); *B29B 2911/14013* (2013.01); *B29C 49/06* (2013.01); *B29C 49/08* (2013.01); *B29K 2105/04* (2013.01); *B29L 2031/7158* (2013.01)

(58) Field of Classification Search
CPC ...... B65D 1/0207; B65D 1/02; B65D 1/0223; B65D 81/30; B32B 5/18; B29B 11/08; B29B 11/06; B29B 2911/14013; B29B 2911/1402; B29B 2911/14026; B29B 2911/14033; B29B 2911/1404; B29B 2911/14; B29C 44/027; B29C 44/0407; B29C 44/08; B29C 44/352; B29C 49/06; B29C 49/08; B29K 2067/003; B29K 2105/041; B29K 2105/046; B29K 2105/258; B29K 2105/04; B29L 2031/712
See application file for complete search history.

(56) References Cited

U.S. PATENT DOCUMENTS

| 9,290,287 B2* | 3/2016 | Ichikawa ................ B29B 11/08 |
| 2010/0326994 A1 | 12/2010 | Ichikawa et al. |
| 2013/0149480 A1 | 6/2013 | Ichikawa et al. |
| 2014/0110415 A1 | 4/2014 | Ichikawa et al. |
| 2014/0183775 A1 | 7/2014 | Ichikawa et al. |
| 2014/0231426 A1 | 8/2014 | Ichikawa et al. |
| 2015/0083737 A1 | 3/2015 | Lino et al. |

FOREIGN PATENT DOCUMENTS

| CN | 101980921 | 2/2011 |
| JP | 09-254294 | 9/1997 |
| JP | 2002-166508 | 6/2002 |
| JP | 2003-026137 | 1/2003 |
| JP | 2005-246822 | 9/2005 |
| JP | 2006-265294 | 10/2006 |
| JP | 2007-22554 | 2/2007 |
| JP | 2007-154172 | 6/2007 |
| JP | 2008-094495 | 4/2008 |
| JP | 2009-234627 | 10/2009 |
| JP | 2009-248386 | 10/2009 |
| JP | 2009-262366 | 11/2009 |
| JP | 2010-173259 | 8/2010 |
| JP | 2010-241475 | 10/2010 |
| WO | 2009/119549 | 10/2009 |
| WO | 2013/161813 | 10/2013 |

OTHER PUBLICATIONS

Search report from PCT/JP2013/061916, mail date is Jul. 16, 2013.
English translation of Korean Office Action issued in Patent Appl. No. 10-2014-7031029, dated Feb. 26, 2016.
Japanese Office Action issued in Counterpart Patent Appl. No. 2013-090404, dated Jan. 17, 2017, along with an english language translation thereof.
Chinese Office Action issued in Counterpart Patent Appl. No. 201510974085.8, dated Mar. 17, 2017.

* cited by examiner

Fig. 7
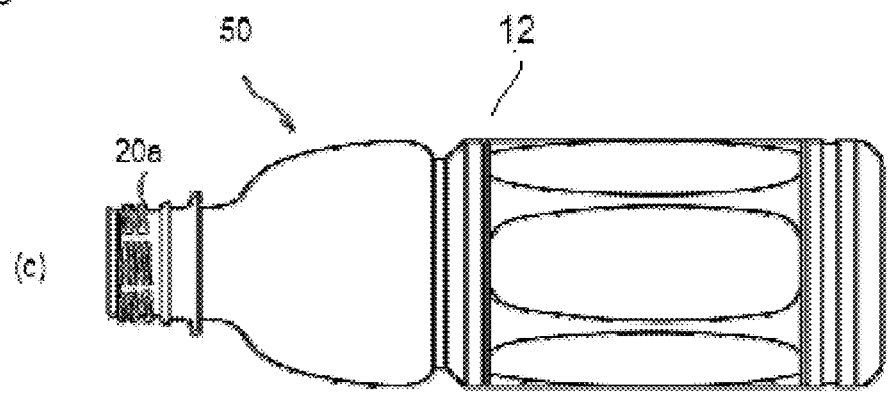
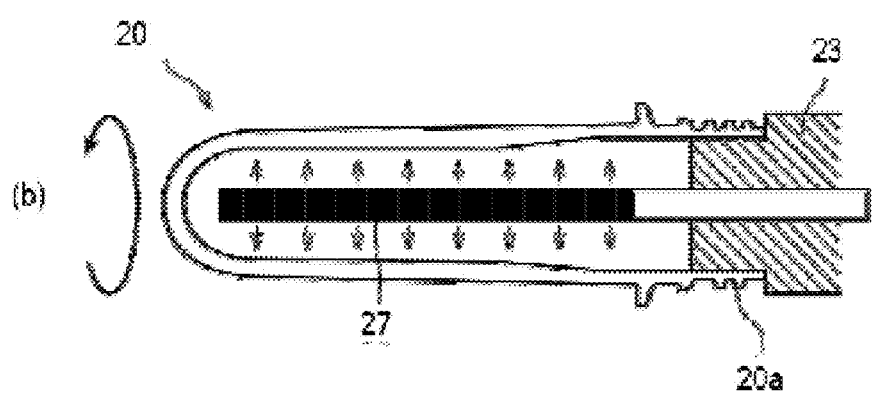
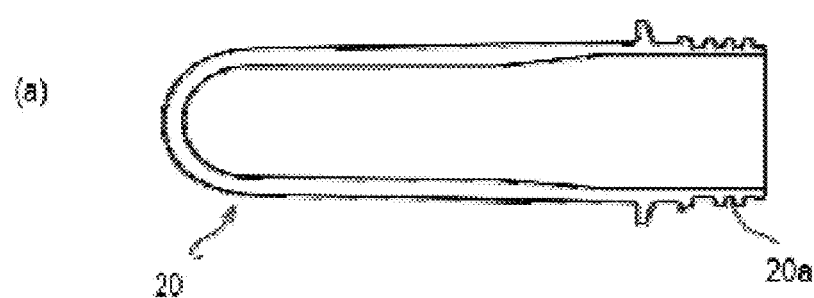

FOAMED AND STRETCHED PLASTIC BOTTLE

TECHNICAL FIELD

This invention relates to a foamed and stretched plastic bottle having, in a body portion thereof, a foamed region containing bubbles distributed therein.

BACKGROUND ART

Containers of a polyester as represented by polyethylene terephthalate (PET) feature excellent properties such as transparency, heat resistance, gas-barrier property and the like properties, and have been extensively used for a variety of kinds of applications.

In recent years, on the other hand, it is a mounting demand to reutilize the resources inclusive of the above polyester containers. Therefore, attempts have been made to recover the used containers and to reuse them as the recycled resin for various applications. Here, many of the contents contained in the packing containers are subject to be degraded with light, as represented by some kinds of beverages, medicines, cosmetics and the like. Therefore, these kinds of contents are provided being contained in opaque containers that are formed by using a resin composition of a resin blended with a coloring agent such as pigment. From the standpoint of reutilizing the resources, however, adding the coloring agent is not desired (since it makes it difficult to maintain transparency in the recycled resins). Therefore, it has now been demanded to use transparent containers. Accordingly, even those opaque containers suited for containing photo-degradable contents must be improved for their properties so as to be used again.

In order to impart light-shielding property (opaqueness) without using coloring agent, it can be contrived to realize a foamed container by making bubbles present in the container wall. A variety of proposals have been made concerning such foamed plastic containers. For instance, a patent document 1 discloses a formed article having a feature in that the foamed cells are having an average diameter that is changing, i.e., the average diameter of the foamed cells present on the front surface side is smaller than the average diameter of the foamed cells present in the inside.

With the formed body in which the average diameter of the foamed cells is changing as proposed by the patent document 1, however, a non-foamed portion (where no foamed cell is present) is thickly formed in the central portion thereof, and light-shielding property is not attained to a sufficient degree. In this case, it can be contrived to form the foamed cells distributed over the whole wall portions so that the non-foamed portion will not be thickly formed in the central portion. According to this means, however, foamed cells of very large sizes are distributed in the central portion of the body portion causing the strength to be very decreased due to the foaming and making it difficult to put it into practical use.

A patent document 2 filed by the present applicant is proposing a foamed plastic container solving the above-mentioned problem. The container of the patent document 2 has a container wall comprising a plastic material in which foamed cells are distributed, the foamed cells in the container wall in the direction of surface thereof having a length that decreases from the outer surface of the container toward the inner surface thereof. Namely, in the patent document 2, a decrease in the gas-barrier property is suppressed by decreasing the size of the cells formed on the inner surface side.

In the container of the patent document 2, however, the size of the foamed cells decreases progressively toward the inner surface side of the container still leaving a problem of a decrease in the light-shielding property despite the foamed cells are formed. Specifically, in a bottle obtained by stretch-molding (blow-molding) the preform, the wall of the body portion has a decreased thickness and the foamed cells overlap less frequently in the direction of thickness. Therefore, multiplex reflection is not so much attained by the foamed cell-containing portion, and the light-shielding property tends to decrease conspicuously. If foaming is promoted to compensate for it, then the bubbles become coarse on the outer surface side making it difficult to attain a high mirror gloss and, therefore, leaving room for improvements.

The present applicant has proposed in a patent document 3 a foamed plastic container in which foamed cells of a flat shape are distributed in the wall being overlapped one upon the other in the direction of thickness thereof, the foamed cells having an average long diameter of not more than 400 μm and an average aspect ratio (long diameter/short diameter) of not less than 6 as viewed in cross section of the container wall in a direction in which it is stretched to a maximum degree. The container has such advantages as pearl-like appearance and a high commercial value. Like the patent document 2, however, the plastic container of the patent document 3, too, still has room for improvements in regard to that it cannot attain a high light-shielding property together with a high mirror gloss if the portion where the foamed cells are formed is forced to have only a limited thickness like that of a bottle. That is, either the patent document 2 or 3 has the foamed cells of a flat shape but also has a problem in that the mirror gloss is lost as the number of the foamed cells increases.

PRIOR ART DOCUMENTS

Patent Documents

Patent document 1: JP-A-2005-246822
Patent document 2: JP-A-2009-234627
Patent document 3: JP-A-2007-22554

OUTLINE OF THE INVENTION

Problems that the Invention is to Solve

It is, therefore, an object of the present invention to provide a foamed and stretched plastic bottle having excellent light-shielding property.

Another object of the present invention is to provide a foamed and stretched plastic bottle which is excellent in both light-shielding property and mirror gloss.

Means for Solving the Problems

The present inventors have conducted a lot of experiments concerning the stretched and foamed bottles in which fine foamed cells are formed in the body portion of the containers by the foaming (foaming based on the so-called microcellular technology) using an inert gas as the foaming agent and, as a result, have discovered that the light-shielding property can be greatly improved if the sizes of the foamed cells (lengths in the axial direction of the container) are distributed in such a fashion that is not found from the foamed cells formed so far in the traditional foamed containers, and have thus completed the present invention.

That is, according to the present invention, there is provided a foamed and stretched plastic bottle forming, in the body portion thereof, a foamed region in which foamed cells are distributed, wherein, in at least a portion of the foamed region, the lengths of the foamed cells in the axial direction of the bottle are so distributed as to gradually decrease as the positions of the foamed cells shift from the outer surface side of the body portion toward the central portion thereof and then gradually increase as their positions shift from the central portion thereof toward the inner surface side thereof.

In the foamed and stretched plastic bottle of the present invention (hereinafter often simply called as "foamed and stretched bottle"), it is desired that as viewed in cross section in the axial direction of the bottle, the foamed cells occupy the region where the lengths of the foamed cells in the axial direction of the bottle are distributed as above at an area ratio of 5 to 50%.

In the foamed and stretched bottle of the present invention, the total light transmission factor is not more than 10% in the region where the lengths are distributed as above, and the light-shielding property is very high.

According to the present invention, further, there is provided a foamed and stretched plastic bottle forming, in the body portion thereof, a foamed region in which foamed cells are distributed, wherein in at least a portion of the foamed region, the lengths of the foamed cells in the axial direction of the bottle are so gradationally distributed as to be the greatest as they are positioned on the inner surface side of the body portion and as to be the smallest as they are positioned on the outer surface side thereof.

In the foamed and stretched bottle, it is desired that a skin layer free of foamed cell is formed on the outer surface side of the region where the lengths of the foamed cells in the axial direction of the bottle are gradationally distributed as above in the foamed region.

In the foamed and stretched plastic bottle of the present invention, the total light transmission factor is not more than 20% in the region that has the above gradation distribution and in this region, the 20-degree specular gloss (JIS Z8741) on the outer surface of the body portion is not less than 40%, exhibiting excellent light-shielding property as well as mirror gloss.

The 20-degree specular gloss (JIS Z8741) is measured by regarding a specular gloss at a specified angle θ of incidence (20 degrees) to be a reference value on the surface of a glass that has a refractive index of 1.567 over the whole range of visible waves, and regarding the above reference value as 100%.

According to the present invention, further, there is provided a foamed and stretched plastic bottle forming, in the body portion thereof, a foamed region in which foamed cells are distributed, wherein in the foamed region, the lengths of the foamed cells in the axial direction of the bottle are so distributed as to gradually decrease as the positions of the foamed cells shift from the outer surface side of the body portion toward the central portion thereof and then gradually increase as their positions shift from the central portion thereof toward the inner surface side thereof; and a foamed region in which foamed cells are distributed, wherein in the foamed region, the lengths of the foamed cells in the axial direction of the bottle are so gradationally distributed as to be the greatest as they are positioned on the inner surface side of the body portion and as to be the smallest as they are positioned on the outer surface side thereof.

Effects of the Invention

In the foamed and stretched bottle of the present invention, the foamed cells have a novel distribution of lengths in the foamed region in the body portion.

Concretely, the lengths of the foamed cells in the axial direction of the bottle are so distributed as to gradually decrease as the positions of the foamed cells shift from the outer surface side toward the central portion thereof and then gradually increase from the central portion thereof toward the inner surface side thereof. Owing to this distribution of lengths of the foamed cells, there is obtained excellent light-shielding property without decreasing the strength that is caused as the foamed cells become very large. In this specification, the foamed and stretched plastic bottle of the present invention having the above distribution of lengths is called α-foamed and stretched plastic bottle.

On the other hand, in the foamed and stretched bottle of the present invention, the lengths of the foamed cells in the axial direction of the bottle can also be so distributed that the lengths thereof are larger as they are on the inner surface side of the body portion and are smaller as they are on the outer surface side thereof. The above distribution of lengths is quite contrary to that of the foamed cells formed in the foamed container of the above patent document 2. The foamed cells having a distribution of lengths in the axial direction of the bottle, that is gradated in the reverse manner, makes it possible to satisfy both the light-shielding property and the mirror gloss. In this specification, the foamed and stretched plastic bottle of the present invention having the above distribution of lengths is called β-foamed and stretched plastic bottle. Further, the distribution of lengths possessed by the β-foamed and stretched plastic bottle is often called gradational distribution.

For example, if the foamed and stretched bottle has such a gradient that the length of the foamed cells in the axial direction of the bottle (hereinafter "cell length") gradually decreases from the outer surface side of the bottle toward the inner surface side thereof, then the cell length becomes very small toward the inner surface side of the bottle and the light-shielding property becomes unsatisfactory. This is because the foamed cells are overlapped less toward the inner surface side of the bottle, multiplex reflection due to the foamed cells decreases, and light passes through in increased amounts through the wall of the bottle body portion.

In the α-foamed and stretched bottle of the present invention, on the other hand, though the cell length may decrease in the center of the wall of the body portion, the cell length increases again from the center toward the inner surface side, and the foamed cells overlap more frequently. Therefore, through the thickness of the body portion of the bottle may have been decreased due to the stretching, the overlapping degree of the foamed cells is maintained on a high level. As a result, multiplex reflection occurs effectively due to the foamed cells, light passes in decreased amounts through the wall of the bottle body portion, and a high degree of light-shielding property is maintained.

In the gradational distribution of cell lengths in the β-foamed and stretched bottle of the invention, further, foamed cells positioned on the outer surface side of the bottle body portion have the smallest cell length and, as a result, a high mirror gloss can be ensured. That is, upon decreasing the length of the foamed cells positioned on the most outer surface side, the intensity of light becomes small that is scattered on the outer surface, and the specular gloss becomes high. If the foamed cells have a large length on the most outer surface side, the intensity of light becomes large that is scattered on the outer surface, and the specular gloss becomes low.

As will be understood from the above description, the specular gloss can be increased by decreasing the length of the foamed cells on the outer surface side. If the cell length is decreased, however, the reflective surface decreases and, as a result, the quantity of reflected light decreases bringing about a decrease in the light-shielding property. In the β-foamed and stretched bottle of the present invention, however, the cell lengths are gradationally distributed; i.e., the foamed cells positioned on the inner surface side have large cell lengths suppressing a decrease in the reflective surface and, at the same time, increasing the degree of foamed cell overlapping in the direction of thickness causing light to be scattered and reflected in a multiplexed manner. As a result, excellent light-shielding property is maintained despite the specular gloss is maintained high by decreasing the cell length on the outer surface side.

Here, the specular luster is a physical property on the surface of a material body, which according to the JIS is defined to be, "appearance of bright reflection of a material body being reflected by its surface depending on a selective direction on the surface". The degree of mirror gloss varies depending much on a ratio of intensities of the regularly reflected light and the scattered light. The specular gloss luster increases with an increase in the intensity of the regularly reflected light and decreases with an increase in the intensity of the scattered light.

BRIEF DESCRIPTION OF THE DRAWINGS

FIG. 7 is a view illustrating a process for producing the β-plastic bottle having the body portion of FIG. 5.

BEST MODES FOR CARRYING OUT THE INVENTION

In a foamed and stretched plastic bottle of the present invention as shown in, for example, FIG. 1, 2, 5 or 6, foamed cells 1 are distributed in the wall of body portion, generally designated as 12, of the bottle that is generally designated at 10. As will be learned from these drawings, the foamed cells 1 have a flat shape oriented in the axial direction of the bottle (corresponds to the direction of a maximum stretch) and are distributed being overlapped one upon the other in the direction of thickness thereof. Namely, it is a basic principle of the present invention that the foamed cells 1 present in the wall of the body portion assume a flat shape by being stretched, that the cells 1 are overlapped one upon the other and are spread in the direction of thickness, and light-shielding property is exhibited over a region where the foamed cells 1 are present therein.

The foamed and stretched plastic bottles having the above feature of the present invention can be divided into those of the two types depending on the lengths of the foamed cells 1 in the axial direction of the bottle, i.e., depending on the distribution of the cell lengths L. The foamed and stretched plastic bottle of the one type is a foamed plastic bottle (α-foamed plastic bottle) in which the lengths L of the foamed cells 1 are so distributed as to gradually decrease from the outer surface side 13 of the wall 10 of the body portion toward the inner surface side 14 thereof and to gradually increase again from the portion of the smallest length toward the inner surface side 14. The foamed and stretched plastic bottle of the another type is a foamed plastic bottle (β-foamed and stretched plastic bottle) in which the lengths L of the foamed cells 1 are gradationally distributed so as to be the greatest on the inner surface side 14 of the body wall 10, so as to gradually decease toward the outer surface side 13 thereof and so as to become the smallest on the outer surface side 13 of the body wall 10.

<α-Foamed and Stretched Plastic Bottle>

The α-Foamed and stretched plastic bottle of the invention will now be described in detail.

Figure 1:
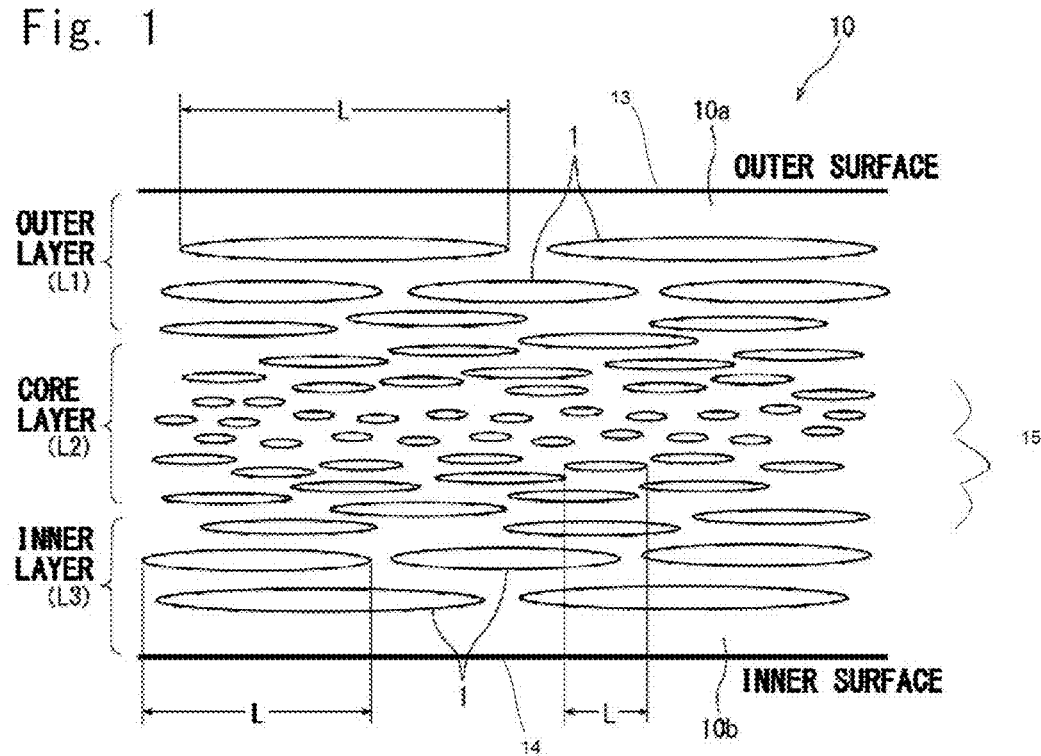
FIG. 1 is a view schematically showing the cross section of the body portion of an α-foamed and stretched bottle of the invention in the axial direction of the bottle.

As described already, in the α-foamed and stretched plastic bottle of the invention, the lengths L of the foamed cells 1 gradually decrease from the outer surface side of the body wall 10 toward the inner surface side thereof and gradually increase again from the portion of the smallest length toward the inner surface side. In FIG. 1, the lengths L of the foamed cells 1 positioned on the outer surface side of the body wall 10 are denoted by $L_1$, the lengths L of the foamed cells 1 positioned near the central portion 15 are denoted by $L_2$, and the lengths L of the foamed cells 1 positioned on the inner surface side are denoted by $L_3$. In the α-foamed and stretched bottle of the invention, there holds a relationship $L_1 > L_2 < L_3$.

In the α-foamed and stretched bottle of the present invention, the cell lengths L are distributed in a manner as described above in the direction of thickness. Therefore, the foamed cells 1 are overlapped much in the direction of thickness despite the wall of the body portion has a small thickness being stretched, and excellent light-shielding property can be expressed.

For instance, if the smallest cell length L ($L_2$) is so large that $L_1 = L_2$ or $L_2 = L_3$, then it means that the foamed cells 1 are growing unnecessarily large. As a result, the foamed cells 1 merge together causing a decrease in the overlapping of foamed cells 1 and hence causing a decrease in the light-shielding property. Further, the foamed cells 1 that are merged together cause a great decrease in the strength of the body wall 10.

In the α-foamed and stretched bottle of the present invention, the lengths should be so distributed that there holds the relationship $L_1 > L_2 < L_3$. The degree of distribution thereof (degree of gradation toward the minimum cell length from the outer surface side or from the inner surface side) or the positions of the foamed cells 1 having the minimum cell length $L_2$ vary depending on the thickness of the body wall 10, and there is no particular limitation on them. However, if the body wall 10 (formed region where the relationship $L_1 > L_2 < L_3$ holds) is divided into three equal layers, i.e., an outer layer, a core layer and an inner layer, and if the above-mentioned cell lengths $L_1$, $L_2$ and $L_3$ are regarded to be the average cell lengths of the foamed cells in the outer layer, core layer and inner layer, respectively, then the average cell length $L_1$ in the outer layer or the average cell length $L_3$ in the inner layer is, preferably, about 20 to about 200 μm and, more preferably, about 20 to about 60 μm. It is, further, desired that the average cell length $L_2$ in the core layer is about 50 to 80% of the average cell length $L_1$ in the outer layer or the average cell length $L_3$ in the inner layer from the standpoint of obtaining a high light-shielding property.

In the α-foamed and stretched bottle of the invention, further, as viewed in cross section of the bottle in the axial direction thereof as shown in FIG. 1, the foamed cells 1 occupy the body wall 10 (foamed region where the relationship $L_1 > L_2 < L_3$ holds) at an area ratio of 5 to 50%, preferably, 10 to 50% and, particularly preferably, 20 to 35%. The area ratio at which the foamed cells 1 occupy the core layer in the body wall 10 (foamed region where the relationship $L_1 > L_2 < L_3$ holds) is, desirably, not more than 10%. This is because if the area ratio is too small or too large, then the number of the foamed cells 1 decreases, the foamed cells 1 are overlapped less one upon the other in the direction of thickness, and the light-shielding property may decrease. Further, if the area ratio is too large, the strength may often very decrease due to foaming. Therefore, the above-mentioned range is preferred. The area ratio occupied by the foamed cells is measured from the image in cross section photographed by the use of the SEM and by using a commercially available image analytical grain size distribution-measuring software (Mac-View produced by Mountec Co.).

Further, in the α-foamed and stretched bottle of the invention, as shown in FIG. 1, it is desired that thin skin layers 10a and 10b free of foamed cell are formed on the outer surface and on the inner surface. The skin layers 10a and 10b have thicknesses of, usually, about 2 to about 200 μm. Upon forming the skin layers 10a and 10b, it is allowed, for example, on the outer surface side, to improve printability and label-sticking property. On the inner surface side, further, inconveniences can be effectively avoided, such as bubbling can be avoided when the bottle is filled with the liquid content, the liquid content can be smoothly discharged out of the bottle, and the liquid content does not remain adhered in the bottle when it is poured out.

In the body wall 10 (foamed region) where the foamed cells 1 are formed having the above-mentioned length distribution, the total light transmission factor is not more than 10%, specifically, not more than 8% and, most desirably, not more than 5%, exhibiting very high light-shielding property.

The α-foamed and stretched bottle of the invention has, in the body wall thereof, the foamed region where the foamed cells 1 are formed having the above-mentioned length distribution, and is produced by foaming by utilizing the microcellular technology or, concretely, by the physical foaming by imbibing an inert gas that will be described later. As the resin for constituting the above bottle wall 10, there can be used any known thermoplastic resins without any specific limitation so far as they can imbibe inert gas and can be blow-stretched. For instance, there can be used:

olefin resin such as low-density polyethylene, high-density polyethylene, polypropylene, poly 1-butene, poly 4-methyl-1-pentene, like random or block copolymer of α-olefins of propylene, 1-butene or 4-methyl-1-pentene, or cyclic olefin copolymer ethylene;

ethylene• vinyl copolymer such as ethylene• vinyl acetate copolymer, ethylene• vinyl alcohol copolymer or ethylene vinyl chloride copolymer;

styrene resin such as polystyrene, acrylonitrile• styrene copolymer, ABS or α-methylstyrene• styrene copolymer;

vinyl resin such as polyvinyl chloride, polyvinylidene chloride, vinyl chloride• vinylidene chloride copolymer, methyl polyacrylate or methyl polymethacrylate;

polyamide resin such as nylon 6, nylon 6-6, nylon 6-10, nylon 11 or nylon 12;

polyester resin such as polyethylene terephthalate (PET), polybutylene terephthalate, polyethylene naphthalate or copolymerized polyester thereof;

polycarbonate resin;

polyphenylene oxide resin; or biodegradable resin such as polylactic acid.

The bottle may be formed by using a blend of these thermoplastic resins, as a matter of course. Specifically, it is desired to use the olefin resins and the polyester resins that have been preferably used in the field of the containers. Among them, the polyester resins such as PET are most desired since they make it possible to utilize the advantages of the present invention to a maximum degree.

<Production of the α-Foamed and Stretched Plastic Bottle>

Figure 2:
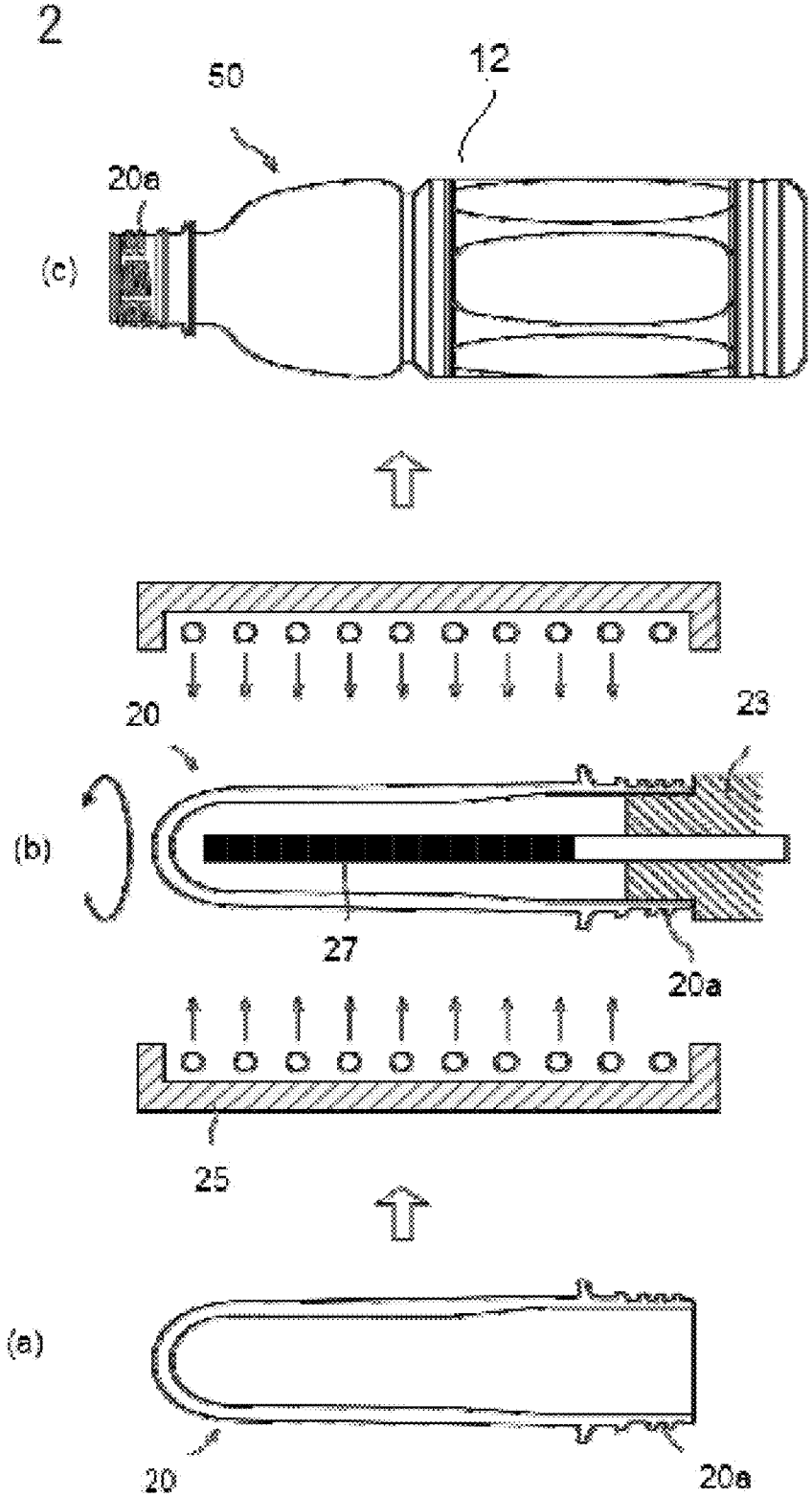
FIG. 2 is a view illustrating a process for producing the α-plastic bottle having the body portion of FIG. 1.

The above-mentioned α-foamed and stretched plastic bottle of the present invention is produced by a process shown in FIG. 2. Namely, a preform 20 imbibing an inert gas such as nitrogen gas or carbon dioxide gas is prepared [FIG. 2(a)]. The preform 20 is then heated under predetermined conditions to form foamed cells [FIG. 2(b)] and is, next, blow-molded to obtain an α-foamed and stretched bottle 50 [FIG. 2(c)] having the body wall 10 shown in FIG. 1.

[Step (a): Production of the Inert Gas-Imbibed Preform]

In the process of production, the preform 20 imbibing the inert gas has the shape of a test tube, and is forming a threaded portion 20a on the outer surface at an upper portion thereof being corresponded to the mouth portion of the bottle that is finally obtained. The preform 20 can be obtained by a known method (e.g., patent documents 1 and WO2009/119549).

For instance, the above-mentioned thermoplastic resin for forming is subjected to the forming means such as injection forming to form the preform 20 of the shape of a test tube having the threaded portion 20a. Next, the preform 20 is placed in an inert gas atmosphere of a high pressure being heated or not being heated so as to imbibe the inert gas. In this case, the temperature and the gaseous pressure are so set that the gas dissolves therein in an amount enough for forming the foamed cells 1 of a flat shape in a desired number. If the temperature is high, the gas dissolves in small amounts but is imbibed at an increased rate. If the temperature is low, on the other hand, the gas dissolves in large amounts but requires extended periods of time for being imbibed.

It is, further, allowable to obtain the formed body imbibing the inert gas by feeding the inert gas with a pressure into the melting/kneading portion of the forming machine, and subjecting the thermoplastic resin for forming in which the inert gas has been dissolved directly to the forming such as injection forming. In this case, to obtain the formed body free of defective appearance such as swirl marks by preventing foaming in the injection-forming machine, it is desired that the plastic material for forming dissolving the inert gas therein is injection-formed while maintaining a high pressure in the mold cavity as proposed by the present applicant in, for example, WO2009/119549, etc.

In imbibing the inert gas in the preform, the shape of the mouth portion may often be deformed due to the gas that fails to escape from the mold. To effectively avoid this problem, it is desired that the surface is roughened at the portion corresponding to the mouth portion of the mold.

When the inert gas is to be imbibed in the injection-forming machine as described above, it is necessary that the thermoplastic resin is injected into the forming mold while maintaining the pressure therein so that the foaming will not substantially take place. By suppressing the foaming as much as possible in this stage, the foamed cells can be formed finely and homogeneously in the step of foaming that will be described later. To inject the thermoplastic resin suppressing the foaming, it is desired that the injection is conducted while maintaining the pressure. That is, after the molten resin of a predetermined amount is injected into the forming mold, the injection is, further, continued while pressurizing the molten resin in the mold to effectively suppress the foaming.

The degree of pressure that is maintained (pressure maintained and time) is suitably set depending on the amount of the inert gas to be imbibed and the resin temperature so that the foaming can be effectively suppressed but is, usually, so set that the weight reduction ratio is not more than 5%. The weight reduction ratio that is small means that the foaming has been suppressed, and the weight reduction ratio of 0% means that the foaming has been completely suppressed. The weight reduction ratio of the preform can be found by experiment according to the following formula.

Weight reduction ratio=$[(M_0-M_1)/M_0] \times 100$ wherein, $M_0$ is the weight of the preform imbibing no inert gas obtained by the injection under the same condition as that for the preform (gas-imbibing preform) that is imbibing the inert gas, and $M_1$ is the weight of the preform that is imbibing the inert gas.

That is, the weight reduction ratio decreases with an increase in the pressure that is maintained and, further, decreases with an increase in the time for maintaining the pressure. In the present invention, it is most desired that the condition of maintaining the pressure is so set that the weight reduction ratio is 0%.

In the invention, further, to form the above-mentioned skin layers 10a and 10b on the surfaces of the body wall 10 of the bottle, the inert gas-imbibing preform 20 that is cooled, solidified and is taken out from the forming mold, is left to stand under normal pressure (atmospheric pressure) for a predetermined period of time. Thus the inert gas for forming foams is released from the outer surface and the inner surface of the preform 20 and, therefore, the skin layers 10a and 10b free of foamed cell 1 can be formed on the outer surface and on the inner surface.

Here, attention should be given to that if the preform is left to stand for too long periods of time, the skin layers 10a and 10b become too thick, and the light-shielding property based on the foaming decreases.

In the inert gas-imbibing preform 20 obtained as described above, the larger the amount of the inert gas dissolved therein, the higher the density of the foamed cells 1 and the shorter the lengths of the foamed cells 1. Conversely, the smaller the amount of the gas that is dissolved, the smaller the cell density and the larger the lengths of the foamed cells. Therefore, the amount of the inert gas imbibition is set depending on the desired distribution of lengths of the foamed cells 1 and the desired cell density (corresponds to the area ratio of the foamed cells).

[Step (b): Foaming]

The inert gas-imbibing preform 20 is foamed in the step of foaming shown in FIG. 2(b). Through the foaming, there is obtained a foamed preform (designated at 30 in FIG. 3) for blow-molding containing foamed cells in the body wall thereof.

In the step of foaming of FIG. 2(b), the preform 20 is heated except the region of the threaded portion 20a. Due to the heating, foaming occurs in the non-foamed preform in which the inert gas is remaining, and a number of foamed cells are formed in the wall thereof. The heating temperature for foaming is not lower than a glass transition point of the resin forming the non-foamed preform. The heating causes a sharp change in the internal energy (free energy) of the inert gas dissolved in the resin, whereby the phase separation is triggered and the foaming develops as bubbles separating away from the resin.

To prevent the foamed preform from deforming, it is desired that the heating temperature is not higher than 200° C. and, specifically, not higher than 115° C., as a matter of course. If the heating temperature is too high, it becomes difficult to control the cell diameter since the foaming takes place sharply after the heating, whereby the appearance deteriorates, the body portion crystallizes, and the blow-moldability decreases.

Further, the heating is effected for the regions except the threaded portion 20a. This is because the foamed cells that are formed in the threaded portion 20a work to deteriorate the dimensional stability and the mechanical strength of the threaded portion 20a, impairing sealability when a cap is fitted thereto.

Figure 3:
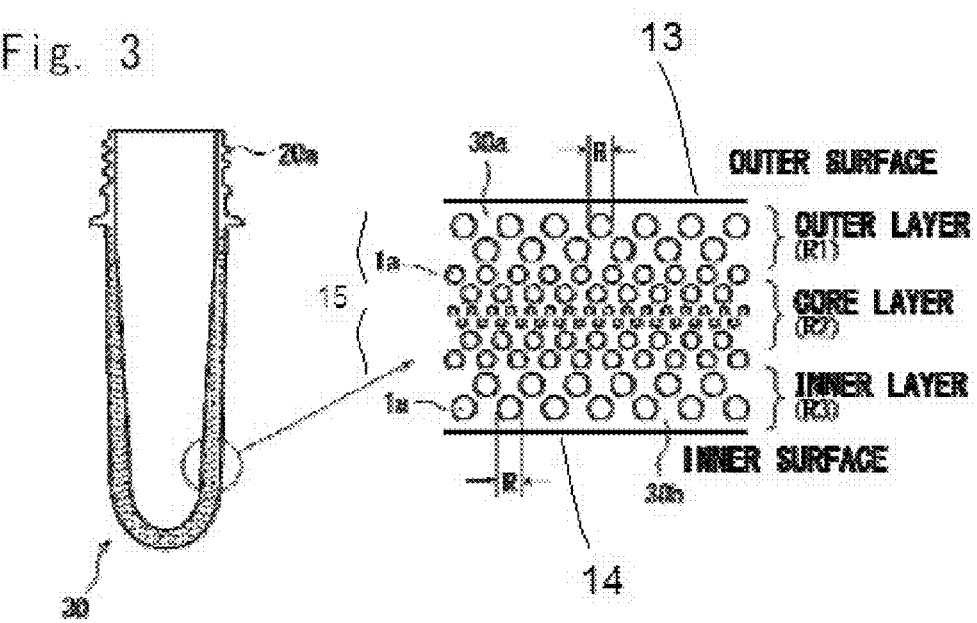
FIG. 3 is a view schematically showing the cross section of the body portion of a foamed preform of before being blow-molded into the α-foamed and stretched bottle in the axial direction.

Here, in the α-foamed and stretched bottle of the present invention, the foamed cells 1 must have been formed in the body wall 10 so as to have the above-mentioned distribution of lengths. In the foamed preform 30 formed by heating as shown in FIG. 3, therefore, the foamed cells 1a are formed in the region excluding at least the threaded portion 20a or, concretely, are formed in the body portion and in the bottom portion, the foamed cells 1a present in the body wall having sizes corresponding to the distribution of lengths possessed by the foamed cells 1 of the flat shape. Further, when the inert gas is released from the surfaces, skin layers 30a and 30b free of spherical foamed cell 1a are formed in the outer surface and in the inner surface of the foamed preform 30.

In FIG. 3, the foamed preform 30 has not been stretched and, therefore, the foamed cells 1a have a spherical shape or a shape close to a sphere (hereinafter, the foamed cells 1a are often called spherical foamed cells). Being corresponded to the distribution of lengths of the flat foamed cells 1, further, the diameter (diameter corresponding to circle) R of the spherical foamed cells 1a gradually decreases from the outer surface side of the body wall toward the inner surface side thereof and gradually increases again from the portion of the smallest diameter toward the inner surface side.

For instance, if the body wall of the foamed preform 30 is divided into three layers of an outer layer, a core layer and an inner layer of an equal thickness, then the average cell diameter $R_1$ in the outer layer or the average cell diameter $R_3$ in the inner layer may have been so set that the above-mentioned distribution of lengths is realized if the body wall is stretched by the blow-molding that will be described later.

Reverting to FIG. 2(b), to obtain the foamed preform 30 shown in FIG. 3 according to the present invention, the body portion of the preform 20 must be foamed by being heated from both the outer surface and the inner surface.

For example, the inert gas-imbibing preform 20 is held by a cooling holder 23 at the mouth portion thereof where the threaded portion 20a is formed. Being heated in this state, the body portion and the bottom portion are selectively heated and foamed. Here, being heated from both the outer surface and the inner surface of the body portion, at least the body wall forms the spherical foamed cells 1a having a distribution of diameters as shown in FIG. 3. Namely, upon being heated at a predetermined temperature, the inert gas dissolved in the preform expands to form spherical foamed cells 1a which grow larger as the heating continues. Due to the heating from both the outer surface side and the inner surface side (both-surface heating), the spherical foamed cells 1a generate and grow from both the outer surface side and the inner surface side. Then due to the heat conducted from the outer surface and the inner surface, the spherical foamed cells 1a generate and grow in the interior, too. In the foaming due to the both-surface heating as shown in FIG. 3, therefore, the spherical formed cells 1a have large diameters on the outer surface side and on the inner surface side (e.g., average cell diameters $R_1$ and $R_3$), and the cells 1a have the smallest diameter R (e.g., average cell diameter $R_2$) in the interior.

In the both-surface heating, the heating from the outer surface side is done by using an external heating member 25 such as quartz heater while rotating the preform 20 that is held by the cooling holder 23.

The heating from the inner surface side is done by inserting in the preform 20 a high-frequency heating rod 27 such as iron core through the cooling holder 23. Simultaneously with the heating from the outer surface side, the rod 27 is heated by high-frequency induction heating, and the heating is accomplished by the heat radiated from the rod 27 that is heated.

In conducting the both-surface heating, the degrees of heating are, respectively, not lower than a glass transition point of the resin but are lower than a crystallization temperature thereof, and are not specifically limited so far as the heating is discontinued before the interior is excessively heated to cause the spherical foamed cells 1a to grow into large sizes. Usually, however, it is desired that the temperatures are both not lower than 100° C. on the inner and outer surfaces and the temperature differential between the inner surface and the outer surface is not more than 15° C. If the temperature the inner surface and the outer surface is too low, the spherical foamed cells do not grow and the light-shielding property is not exhibited to a sufficient degree. If the temperature differential between the inner surface and the outer surface is too great, the size greatly differs between the foamed cells 1 present on the outer surface side and the foamed cells 1 present on the inner surface side, and it becomes difficult to impart such a distribution that the foamed cells 1 become gradually smaller from the outer surface side toward the central portion and, next, becomes gradually larger from the central portion toward the inner surface side. In this case, too, the light-shielding property is not exhibited to a sufficient degree. To suppress the temperature differential between the inner surface and the outer surface to lie within a predetermined range, it is also helpful to adjust the output of the quartz heater or the temperature of the heating rod, or to blow the cooling air onto the outer surface of the preform simultaneously with the heating by the quartz heater from the outer surface side so that the temperature will not excessively rise on the outer surface of the preform.

[Step (c): Forming]

In the present invention, the foamed preform 30 obtained by heating both surfaces thereof is blow-molded to obtain an α-foamed and stretched bottle 50 forming, in the body wall 10, the flat foamed cells 1 having the length distribution shown in FIG. 1.

That is, as shown in FIG. 2(c), the bottle 50 has the threaded portion 20a that has not been foamed, and the body portion continuous to the threaded portion 20a as well as the bottom portion, and the body wall contains the foamed cells 1 having lengths distributed as shown in FIG. 1.

In the step of blow-molding, the foamed preform 30 heated at a temperature higher than the glass transition temperature of the resin but lower than the melting point thereof is arranged in a predetermined blow mold, and a pressurized gas such as air or nitrogen is blown into the preform to expand and stretch the preform while also stretching the preform by using a stretch rod. The α-foamed and stretch bottle 50 of the invention is obtained through the above step.

That is, in the above blow-molding, the spherical foamed cells 1a are stretched together with the preform wall; i.e., there are formed foamed cells 1 of a flat shape having a long cell diameter (i.e., large cell length) in the direction in which they are stretched as shown in FIG. 1.

In the present invention, the blow-molding is conducted under the known conditions. Concretely, the preform is stretched in the biaxial directions, i.e., in the axial direction (direction of height) and in the circumferential direction at stretching ratios of about 2 to about 4 times. Specifically, the preform is blow-molded by so adjusting the stretching ratios and the blowing pressure that the body wall assumes a thickness of about 150 to about 750 μm. For instance, upon increasing the stretching ratio and increasing the blowing pressure, it is allowed to increase the cell lengths $L_1$ and $L_3$ on the outermost surface side and on the innermost surface side.

In producing the α-formed and stretched bottle 50 of the invention as described above, the glass transition point of the resin decreases linearly or exponentially with an increase in the amount of the inert gas that is dissolved. Further, the viscoelasticity of the resin varies as the gas dissolves, e.g., the viscosity of the resin decreases with an increase in the amount of gas that is dissolved. That is, by taking into consideration the amount of the inert gas that is dissolved, a variety of conditions should be so set that the spherical foamed cells 1a are formed having diameters distributed as shown in FIG. 3 and that the flat foamed cells 1 are formed having lengths distributed as shown in FIG. 1.

In the α-foamed and stretched bottle 50 of the present invention produced as described above, it is desired that the foamed region where the foamed cells 1 are present therein is formed over the whole body portion. Depending on the cases, however, the foamed region can be formed in only a part of the body portion. To form the foamed region in only a part of the body portion, only a portion where the foamed region is to be formed may be heated at a predetermined temperature in the above step (b) of foaming.

The α-foamed and stretched bottle 50 of the invention has flat foamed cells 1 formed in the body portion thereof having lengths distributed as shown in FIG. 1 and, therefore, exhibits very high light-shielding property effectively avoiding the liquid contained in the bottle from being deteriorated by the irradiation of light.

<β-Foamed and Stretched Plastic Bottle>

Next, of the foamed and stretched plastic bottles of the invention, described below in detail is the β-foamed and stretched plastic bottle.

Figure 5:
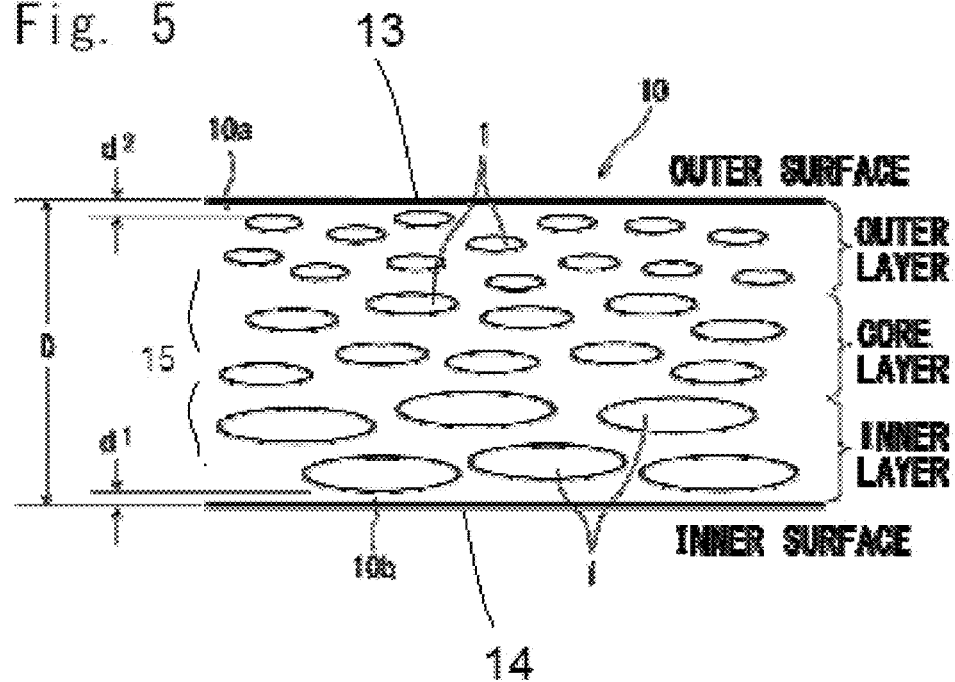
FIG. 5 is a view schematically showing the cross section of the body portion of a β-foamed and stretched bottle of the present invention in the axial direction of the bottle.

Referring to FIG. 5, in the β-foamed and stretched bottle of the invention as described already, the foamed cells 1 have the cell length L which is the largest on the inner surface side of the body wall 10, gradually decreases toward the outer surface side and is the smallest on the outer surface side of the body wall 10.

The thickness D of the body wall 10 varies depending on the use and size of the bottles but is about 150 to about 750 μm in the case of a beverage bottle widely placed in the market.

That is, in the β-foamed and stretched bottle of the present invention, the foamed cells 1 have the smallest cell length L on the outer surface side of the body wall 10. However, due to the gradational foaming as described above, the foamed cells 1 have the longest cell length L on the inner surface side of the body wall 10. Despite the body wall 10 is stretched to assume a decreased thickness, therefore, the foamed cells 1 can still be much overlapped one upon the other in the direction of thickness making it possible to express excellent light-shielding property.

If the foamed cells 1 having a small cell length L are distributed over the whole body wall 10 without employing the above-mentioned gradational foaming, a mirror gloss can be obtained accompanied, however, by a great decrease in the light-shielding property. If the foamed cells 1 having a large cell length L are distributed, the light-shielding property can be satisfactory but the mirror gloss cannot be satisfactory.

By employing the gradational foaming as described above, it is allowed to obtain both the light-shielding property and the mirror gloss.

In the embodiment of FIG. 5, thin skin layers 10b and 10a free of foamed cell 1 are formed in the inner and outer surfaces of the body wall 10. Upon forming the skin layers 10b and 10a, it is allowed to make, for example, the outer surface smooth having a surface roughness Ra of not more than 5 μm. As a result, the specular gloss can be improved and, further, the printability and label-sticking property can also be improved. On the inner surface side, further, inconveniences can be effectively avoided, such as bubbling can be avoided when the bottle is filled with the liquid content, the liquid content can be smoothly discharged out of the bottle, and the liquid content does not remain adhered in the bottle when it is poured out.

The above gradational foaming is formed by heating the preform for forming the β-foamed and stretched bottle from the inner surface side of the body portion. In this connection, the skin layer 10b formed on the inner surface side has a thickness $d^1$ that is, usually, as thin as about 2 to 50 μm. That is, the foaming starts from the inner surface side and proceeds toward the outer surface side and, therefore, the skin layer 10b on the inner surface side is limited to possess a small thickness $d^1$. It is allowable to increase the thickness $d^1$ which, however, causes a decrease in the number of the foamed cells 1 distributed over the whole body wall 10 and, therefore, causes a decrease in the light-shielding property.

In the β-foamed and stretched bottle of the present invention, the degree of specular gloss can be adjusted relying on the thickness $d^2$ of the skin layer 10a formed on the outer surface side. As shown, for example, in FIG. 6, the degree of specular gloss can be increased by increasing the thickness of the skin layer 10a on the outer surface side. The intensity of light scattered and reflected by the outer surface decreases with an increase in the thickness $d^2$ of the skin layer 10a. Therefore, if the skin layer 10a is formed in an increased thickness, the same degree of specular gloss can be obtained despite the degree of foaming on the inner surface side is higher than that of the case of FIG. 5.

However, if the thickness $d^2$ of the skin layer 10a becomes too large, the number of the foamed cells 1 decreases as a matter of course, and the light-shielding property deceases. Therefore, the skin layer 10a should be formed maintaining such a thickness $d^2$ that a suitable degree of light-shielding property is maintained.

In the β-foamed and stretched bottle of the invention, the degree of gradation in the gradational distribution of lengths of the foamed cells 1 is so set that both the light-shielding property and the specular gloss can be attained. Concretely, the degree of gradation is so set that the total light transmission factor is not more than 20%, desirably, not more than 10%, and the 20-degree specular gloss (JIS Z8741) on the outer surface of the body portion in the region having the gradational distribution is not less than 40%, specifically, not less than 70% and, most desirably, not less than 100%. However, the cell lengths of the foamed cells 1 on the inner surface side are set to lie in a predetermined range from such a standpoint that the body wall 10 has a decreased thickness as a result of being stretched and that the preform is heated for being foamed from the one direction, i.e., from the inner surface side of the body portion. For instance, if the body wall 10 (foamed region having the gradational distribution) is equally divided into three layers of an inner layer, a core layer and an outer layer, the average cell length L in the inner layer is in a range of about 20 to about 400 μm, and the degree of gradation (cell lengths of the foamed cells 1 on the outer surface side) may be set depending on the average cell length in the inner layer so that the above-mentioned total light transmission factor and the specular gloss can be obtained.

In the β-foamed and stretched bottle of the present invention, an important factor for obtaining the mirror gloss is that the ratio of area occupied by the bubbles is small in the outer layer and that the skin layer is present on the outer surface side. To impart a favorable surface luster, it is desired that the ratio of area occupied by the bubbles is about 0 to about 5% in the outer layer. The area ratio occupied by the foamed cells is measured from the image in cross section photographed by the use of the SEM and by using a commercially available image analytical grain size distribution-measuring software (Mac-View produced by Mountec Co.). It is desired that the thickness of the skin layer positioned on the outer surface side has been set to be about 30 to about 300 μm.

The β-foamed and stretched bottle of the present invention has, in the body wall thereof, the foamed region where the foamed cells 1 are formed having the above-mentioned length distribution, and is produced by the foaming by utilizing the microcellular technology or, concretely, by the physical foaming by imbibing the inert gas that will be described later. As the resin for constituting the above bottle wall 10, there can be used any known thermoplastic resins without any specific limitation so far as they can imbibe inert gas and can be blow-stretched. Concretely, there can be used the same resins as those exemplified for forming the α-foamed and stretched bottle. Specifically, it is desired to use the olefin resins and the polyester resins that have been preferably used in the field of the containers. Among them, the polyester resins such as PET are most desired since they make it possible to utilize the advantages of the present invention to a maximum degree.

<Production of the β-Foamed and Stretched Plastic Bottle>

The above-mentioned β-formed and stretched plastic bottle of the present invention is produced by a process shown in FIG. 7. Namely, a preform 20 imbibing an inert gas such as nitrogen gas or carbon dioxide gas is prepared [FIG. 7(a)]. The preform 20 is then heated under predetermined conditions to form foamed cells [FIG. 7(b')] and is, next, blow-molded to obtain a β-foamed and stretched bottle 50 [FIG. 7(c)] having the body wall 10 shown in FIG. 5 or 6.

[Step (a): Production of the Inert Gas-Imbibing Preform]

In the process of production, the preform 20 imbibing the inert gas can be obtained in the same manner as that of the α-foamed and stretched plastic bottle.

[Step (b'): Foaming]

The inert gas-imbibing preform 20 thus obtained is foamed in the next step of foaming shown in FIG. 7(b'). Through this step, there is obtained a foamed preform (designated at 30 in FIG. 8) for blow-molding containing foamed cells 1a in the body wall thereof.

In the step of forming of FIG. 7(b'), the preform 20 is heated except the region of the threaded portion 20a. Due to the heating, forming occurs in the non-foamed preform in which the inert gas is remaining, and a number of foamed cells are formed in the wall thereof. The heating temperature for foaming is not lower than a glass transition point of the resin forming the non-foamed preform. The heating causes a sharp change in the internal energy (free energy) of the inert gas dissolved in the resin, whereby the phase separation is triggered and the foaming develops as bubbles separating away from the resin.

To prevent the foamed preform from deforming, it is desired that the heating temperature is not higher than 200° C. and, specifically, not higher than 115° C., as a matter of course. If the heating temperature is too high, it becomes difficult to control the cell diameter since the foaming takes place sharply after the heating, whereby the appearance deteriorates, the body portion crystallizes, and the blow-moldability decreases.

Further, the heating is effected over the regions except the threaded portion 20a. This is because the foamed cells that are formed in the threaded portion 20a work to deteriorate the dimensional stability and the mechanical strength of the threaded portion 20a, impairing sealability when a cap is fitted thereto.

Figure 8:
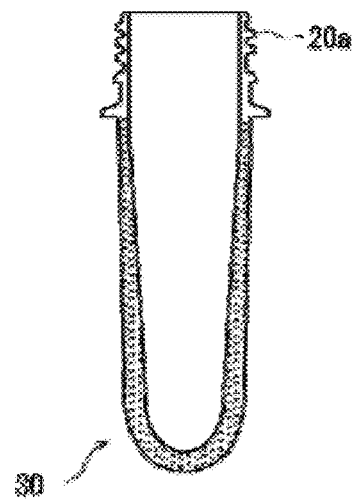
FIG. 8 is a view showing a foamed preform of before being blow-molded into the β-foamed and stretched bottle.

Here, in the β-foamed and stretched bottle of the present invention, the foamed cells 1 must have been formed in the body wall 10 so as to have the above-mentioned distribution of lengths. In the foamed preform 30 formed by heating as shown in FIG. 8, therefore, the foamed cells 1a of a spherical shape or a shape close to the spherical shape, i.e., the spherical foamed cells 1a are formed in the region excluding at least the threaded portion 20a or, concretely, are formed in the body portion and in the bottom portion. The spherical foamed cells 1a present in the body wall turn into foamed cells 1 of a flat shape shown in FIG. 5 or 6 due to the stretching that will be described later.

Figure 6:
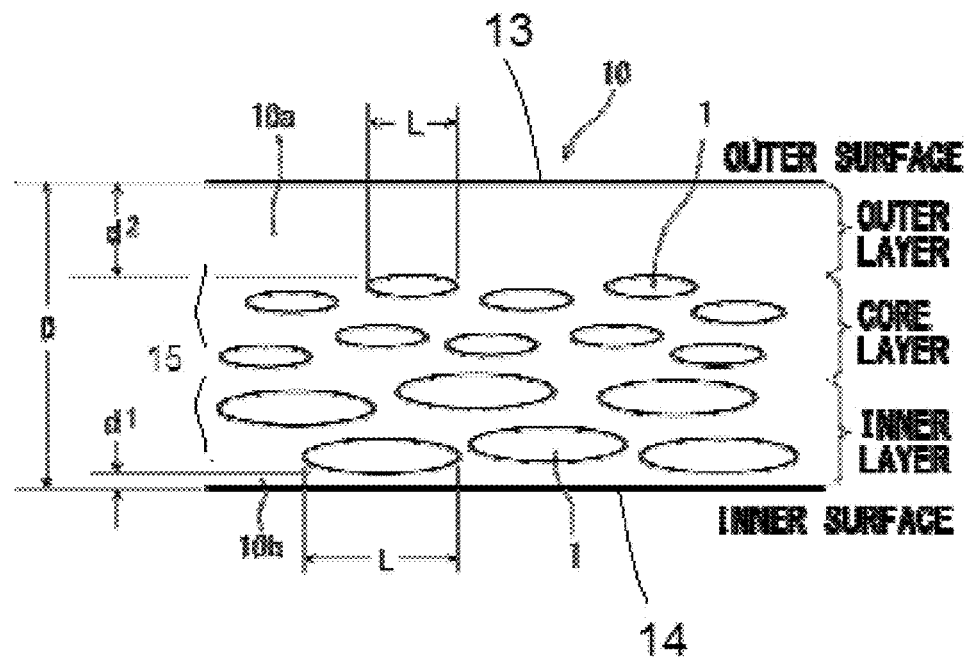
FIG. 6 is a view schematically showing the cross section of the body portion of another β-foamed and stretched bottle of the present invention in the axial direction of the bottle.

The foamed preform 30 formed by the heating assumes the structure in which the spherical foamed cells 1a are gradationally distributed as shown in FIG. 9(a) if the body wall 10 of the bottle is gradationally formed as shown in FIG. 5, and assumes the structure in which the foamed cells are gradationally distributed as shown in FIG. 9(b) if the body wall 10 of the bottle is gradationally formed as shown in FIG. 6. In either case, skin layers 30a and 30b free of spherical foamed cell 1a are formed on the outer surface and the inner surface of the foamed preform 30.

Figure 9:
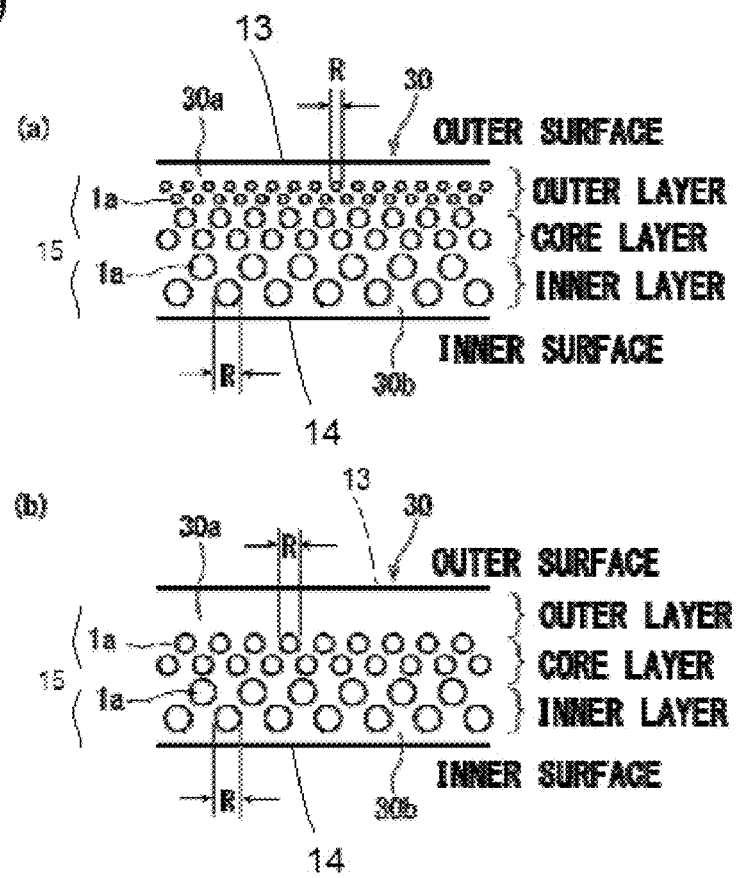
FIG. 9 is a view schematically showing the cross sections of the body portions of foamed preforms corresponding to the body portions of the β-foamed and stretched bottles of FIG. 5 or FIG. 6.

In FIG. 9, the foamed preform 30 has not been stretched and, therefore, the foamed cells 1a have a spherical shape or a shape close to a sphere. Being corresponded to the distribution of lengths of the flat foamed cells 1 formed by stretching, further, the diameter (diameter corresponding to circle) R of the spherical foamed cells 1a gradually decreases from the inner surface side of the body wall toward the outer surface side thereof, the diameter being the greatest on the inner surface side and being the smallest on the outer surface side.

For instance, if the body wall of the foamed preform 30 is divided into three layers of an outer layer, a core layer and an inner layer of an equal thickness, then the average cell diameter R in the inner layer should have the above-mentioned average length (20 to 400 µm) when the body wall is stretched by blow-molding that will be described later.

Reverting to FIG. 7(b'), to obtain the foamed preform 30 that is gradationally foamed shown in FIG. 9(a) or 9(b) which is for forming the β-foamed and stretched bottle of the present invention, the body portion of the preform 20 must be foamed by being heated basically in one way or from the inner surface.

For example, the inert gas-imbibing preform 20 is held by the cooling holder 23 at the mouth portion thereof where the threaded portion 20a is formed. Being heated in this state, the body portion and the bottom portion are selectively heated and foamed. Here, being heated from the inner surface side of the body portion, at least the body wall forms the spherical foamed cells 1a having a distribution of diameters as shown in FIG. 9(a) or (b). Namely, upon being heated at a predetermined temperature, the inert gas dissolved in the preform expands to form spherical foamed cells 1a which grow larger as the heating continues. Due to the heating in one way from the inner surface side, the spherical foamed cells 1a generate and grow from the inner surface side and diffuse toward the outer surface side due to the heat conducted from the inner surface. In the foaming due to the heating in one direction of from the inner surface side, therefore, the spherical foamed cells 1a have large diameters R on the inner surface side and, the cells 1a have the smallest diameter R on the outer surface side as shown in FIG. 9(a) or (b).

In the one-way heating of from the inner surface side, the high-frequency heating rod 27 such as iron core is inserted in the preform 20 through the cooling holder 23, the rod 27 is heated by high-frequency induction heating while rotating the preform 20, and heating is accomplished by the heat radiated from the rod 27 that is heated.

Here, to heat the preform that is used for forming a general beverage bottle shown in Experimental Examples described later up to a temperature at which it can be blown, however, the inner surface side thereof must be heated at a considerably high temperature. This causes the inner surface side only to be positively heated resulting in the formation of coarse bubbles. This can be effectively avoided by also auxiliary heating the outer surface side thereof by using a quartz heater or the like.

That is, the β-foamed and stretched bottle of the present invention is heated from the inner surface side such that the region for forming the foamed cells 1a is heated to a temperature not lower than the glass transition point of the resin but lower than the crystallization temperature thereof. Here, however, to attain the gradational foaming as shown in FIG. 5 or 6, the heating output is so adjusted that the temperature is high on at least the inner surface side and is low on the outer surface side. Generally, if the temperature differential is small between the inner surface and the outer surface, there takes place the gradational foaming of a pattern shown in FIG. 5 (the skin layer 10a has a small thickness on the outer surface side). If the temperature differential is large between the inner surface and the outer surface, there takes place the gradational foaming of a pattern shown in FIG. 6 (the skin layer 10a has a large thickness on the outer surface side).

If the body portion of the preform 20 that is heated has a thickness that is not so large, it becomes difficult to increase the temperature differential between the inner surface and the outer surface. In such a case, there can be suitably employed such means that blows the air onto the outer surface side simultaneously with the heating.

[Step (c): Forming]

By subjecting the foamed preform 30 obtained by the above method to the blow-molding, there is obtained a β-stretched and foamed bottle 50 forming flat foamed cells 1 in the body wall 10 thereof, the flat foamed cells 1 having the length distribution as shown in FIG. 5 or 6. The blow-molding is conducted in the same manner as in the case of forming the α-foamed and stretched bottle.

In producing the β-foamed and stretched bottle 50 of the invention as described above, the glass transition point of the resin decreases linearly or exponentially with an increase in the amount of the inert gas that is dissolved. Further, the viscoelasticity of the resin varies as the gas dissolves, e.g., the viscosity of the resin decreases with an increase in the amount of gas that is dissolved. That is, by taking into consideration the amount of the inert gas that is dissolved, a variety of conditions should be so set that the spherical foamed cells 1a are formed having diameters distributed as shown in FIG. 9(a) or (b) and that the flat foamed cells 1 are formed having lengths distributed as shown in FIG. 5 or 6.

In the β-foamed and stretched bottle 50 of the present invention produced as described above, it is desired that the foamed region where the foamed cells 1 are present therein is formed over the whole body portion. Depending on the cases, however, the foamed region can be formed in only a part of the body portion. To form the foamed region in only a part of the body portion, only a portion where the foamed region is to be formed may be heated at a predetermined temperature in the above step (b') of foaming.

The β-foamed and stretched bottle 50 of the invention has flat foamed cells 1 formed in the body wall 10 having lengths distributed as shown in FIG. 5 or 6 and, therefore, exhibits very high light-shielding property and mirror gloss and, specifically, excellent appearance.

As described already, the foamed and stretched plastic bottles of the present invention include those of the two types, i.e., the α-formed and stretched bottles and the β-foamed and stretched bottles. The foamed and stretched bottles of the either type have a novel distribution of foamed cell lengths that had not been known so far. Namely, excellent light-shielding property is exhibited despite the foamed region has a small limited thickness. Specifically, the α-foamed and stretched bottle has very excellent light-shielding property though its mirror gloss is comparable to that of the conventional foamed and stretched bottles. On the other hand, the β-foamed and stretched bottle has excellent specular luster in addition to its excellent light-shielding property. In the present invention, therefore, the distribution of foamed cell lengths may be suitably determined depending on the kind of the content contained in the plastic bottle. Concretely speaking, if the plastic bottle must have a particularly high light-shielding property, then it is recommended to produce the α-foamed and stretched bottle. Further, if it is desired to impart a mirror gloss to the plastic bottle while imparting, at the same time, the light-shielding property which is high to a certain degree, then it is recommended to produce the β-foamed and stretched bottle.

In the foamed and stretched plastic bottle of the present invention, further, the foamed region may include both the region where the foamed cells have a length distribution specific to the α-foamed bottle and the region where the foamed cells have a gradational distribution specific to the β-foamed bottle (hereinafter often called α β-foamed bottle). Concretely, in a bottle, the label-sticking portion where appearance of the container is not much of a problem may form the foamed cells having a length distribution specific to the α-foamed bottle giving priority to the high light-shielding property, whereas the portion to where no label is stuck, such as the upper portion of the container where importance is given to the appearance of the container should form the foamed cells having a gradational distribution specific to the β-foamed bottle. To produce the α β-foamed bottle, heating distribution for the inner and outer surface may be adjusted in the axial direction of the bottle in the step of foaming.

EXAMPLES

Excellent effects of the invention will now be described by way of the following Experimental Examples.

Experimental Examples 1 to 5 are to explain excellent effects of the α-foamed and stretched bottle of the present invention.

Experimental Example 1

A commercially available PET resin (intrinsic viscosity: 0.84 dl/g) for bottle sufficiently dried by using desiccator/drier was fed into a hopper of an injection-forming machine. Further, a nitrogen gas was fed in an amount of 0.15% by weight through the middle of the heating cylinder of the injection-forming machine, and was kneaded with the PET resin so as to be dissolved therein. In order to suppress the foaming in the mold, the pressure in the mold had been elevated in advance with the air (pressure in the mold, 5 MPa) and while adjusting the pressure therein so will not to permit the foaming (pressure of 50 MPa for 12 seconds until injected), the PET resin was injected-formed to obtain a container preform (weight, 31.6 g) of the shape of a test tube imbibing the gas.

The gas-imbibing preform was heated from the outer surface side thereof by using a quartz heater and was heated from the inner surface side thereof by inserting therein an iron core heated by high frequencies (to prepare a foamed preform). The thus obtained foamed preform was blow-molded to obtain a foamed bottle having a capacity of about 500 ml.

The foamed preform just after being heated (just prior to being blow-molded) was measured for its temperature on the outer surface thereof by using a radiation thermometer to be 104° C. and was measured for its temperature on the inner surface thereof by using a thermocouple to be 100° C.

Figure 4:
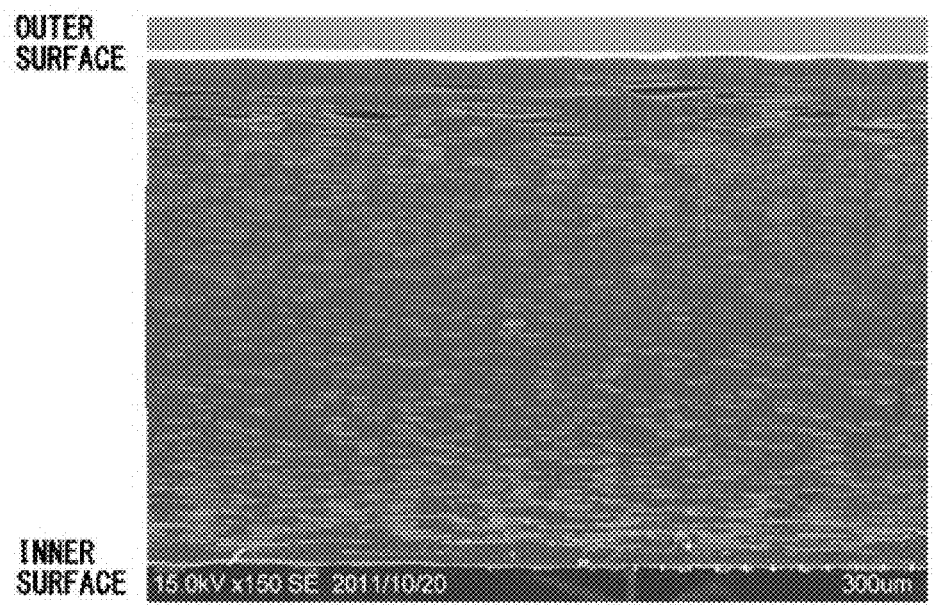
FIG. 4 is a SEM photograph of cross section of the body portion of the α-foamed and stretched bottle prepared in Experimental Example 1.

The obtained foamed bottle was observed on its cross section by using the SEM. FIG. 4 is a photograph thereof. As shown in FIG. 4, a number of flat cells had been formed in the bottle wall. By using the commercially available image analytical grain size distribution-measuring software (Mac-View produced by Mountec Co.), further, the distribution of cell lengths was evaluated. When the cross section of the body wall was divided into three in the direction of the thickness, the foamed cells possessed average lengths in the axial direction of the bottle of 29.24 μm in the outer layer, 15.85 μm in the core layer and 24.94 μm in the inner layer. Namely, the cell length gradually decreased from the outer surface side toward the central portion and gradually increased again from the central portion toward the inner surface side. The foamed cells occupied the foamed region at an area ratio of 9.7%. The average number of the cells was 25.2 in the direction of thickness.

Further, by using a spectrophotometer {UV-3100PC manufactured by Shimazu Mfg. Co.}, the wall surface of the body portion of the foamed bottle was measured for its total light transmission factor at a wavelength of 500 nm relying on the integrating sphere type measuring method to learn that the light-shielding property was as excellent as 8.1%.

Experimental Example 2

A gas-imbibing preform was prepared under the same conditions as those in Experimental Example 1, and from which a foamed bottle was formed in the same manner as in Experimental Example 1 but elevating the temperature of the iron core. The temperature just before the blowing was 107° C. on the outer surface and 118° C. on the inner surface.

By using the SEM, the foamed bottle was observed in the same manner as in Experimental Example 1 and was measured for its distribution of cell diameters to learn that a number of flat cells had been formed in the wall of the bottle. The average lengths of the foamed cells in the axial direction of the bottle were 33.03 μm in the outer layer, 24.96 μm in the core layer and 34.81 μm in the inner layer. Namely, there had been formed the foamed cells having the same length distribution as that of Experimental Example 1. The foamed cells occupied the foamed region at an area ratio of 19.0%. The average number of the cells was 53.0 in the direction of thickness. The total light transmission factor at a wavelength of 500 nm was 4.7% exhibiting further improved light-shielding property.

Experimental Example 3

A gas-imbibing preform was prepared under the same conditions as those in Experimental Example 1, and from which a foamed bottle was formed in the same manner as in Experimental Example 1 but lowering the temperature of the iron core. The temperature just before the blowing was 103° C. on the outer surface and 90° C. on the inner surface.

By using the SEM, the foamed bottle was observed in the same manner as in Experimental Example 1 to confirm that there had been formed flat cells but in a small number. The average lengths of the foamed cells in the axial direction of the bottle were 33.27 μm in the outer layer, 12.34 μm in the core layer and 8.89 μm in the inner layer. Namely, there had been formed the foamed cells having such a gradational tendency that the foamed cell sizes gradually decreased from the outer surface side toward the inner surface side. The foamed cells occupied the foamed region at an area ratio of 4.8%. The average number of the cells was 10 in the direction of thickness. The total light transmission factor at a wavelength of 500 nm was 14.9% exhibiting light-shielding property that was insufficient for the bottles.

Experimental Example 4

A gas-imbibing preform was prepared under the same conditions as those in Experimental Example 1 but feeding the nitrogen gas in an amount of 0.11% by weight, and from which a foamed bottle was formed under the same conditions as those in Experimental Example 2. The temperature just before the blowing was 102° C. on the outer surface and 116° C. on the inner surface.

By using the SEM, the foamed bottle was observed in the same manner as in Experimental Example 1 and was measured for its distribution of cell lengths to learn that a number of flat cells had been formed in the wall of the bottle. The average lengths of the foamed cells in the axial direction of the bottle were 41.46 μm in the outer layer, 31.42 μm in the core layer and 52.67 μm in the inner layer. Namely, there had been formed the foamed cells having the same length distribution as that of Experimental Example 1. The foamed cells occupied the foamed region at an area ratio of 13.4%. The average number of the cells was 17.2 in the direction of thickness. The total light transmission factor at a wavelength of 500 nm was 9.8% exhibiting good light-shielding property despite of feeding the gas in a decreased amount.

Experimental Example 5

A gas-imbibing preform was prepared under the same conditions as those in Experimental Example 4, and from which a foamed bottle was formed in the same manner as in Experimental Example 4 but lowering the temperature of the iron core. The temperature just before the blowing was 96° C. on the outer surface and 91° C. on the inner surface.

By using the SEM, the foamed bottle was observed in the same manner as in Experimental Example 1 to make sure that almost no foamed cell had been formed. The total light transmission factor at a wavelength of 500 nm was 54.8% and the light-shielding property was insufficient.

The results of Experimental Examples 1 to 5 were as shown in Table 1 below.

TABLE 1

| | Amount of gas fed (%) | Outer surface temp. (° C.) | Inner surface temp. (° C.) | Ave. cell size in the axial direction of the bottle (μm) | | | Area ratio of foamed cells (%) | Ave. cell number in the thick direction | Light transmission factor (%) |
|---|---|---|---|---|---|---|---|---|---|
| | | | | Outer layer | Core Layer | Inner layer | | | |
| Ex. 1 | 0.15 | 104 | 100 | 29.24 | 15.85 | 24.85 | 9.7 | 25.2 | 8.1 |
| Ex. 2 | 0.15 | 107 | 118 | 33.03 | 24.96 | 34.81 | 19.0 | 53.0 | 4.7 |
| Ex. 4 | 0.11 | 102 | 116 | 41.46 | 31.42 | 52.67 | 13.4 | 17.2 | 9.8 |

TABLE 1-continued

| | Amount of gas fed (%) | Outer surface temp. (° C.) | Inner surface temp. (° C.) | Ave. cell size in the axial direction of the bottle (μm) | | | Area ratio of foamed cells (%) | Ave. cell number in the thick direction | Light transmission factor (%) |
|---|---|---|---|---|---|---|---|---|---|
| | | | | Outer layer | Core Layer | Inner layer | | | |
| Ex. 3 | 0.15 | 103 | 90 | 33.27 | 12.34 | 8.885 | 4.8 | 10 | 14.9 |
| Ex. 5 | 0.11 | 96 | 91 | — | — | — | 0 | 0 | 54.8 |

Experimental Examples 6 to 11 are for explaining excellent effects of the β-foamed and stretched bottles of the present invention.

Experimental Example 6

A gas-imbibing preform was prepared under the same conditions as those in Experimental Example 1 but feeding the nitrogen gas in an amount of 0.13% by weight.

Further, the gas-imbibing preform was heated from its inner surface by inserting the iron core heated by high frequencies and was heated from its outer surface by using the quartz heater (preparation of the foamed preform). Here, the core temperature and the quartz heater output were so adjusted that the temperature on the inner surface of the preform was higher than the temperature on the outer surface thereof. Further, the foamed preform was blow-molded to obtain a foamed bottle having a capacity of about 500 ml.

The foamed preform just after heated (just before blow molded) was measured for its temperature on the outer surface by using the radiation thermometer to be 100° C. and was measured for its temperature on the inner surface by using the thermocouple to be 113° C.

Figure 10:
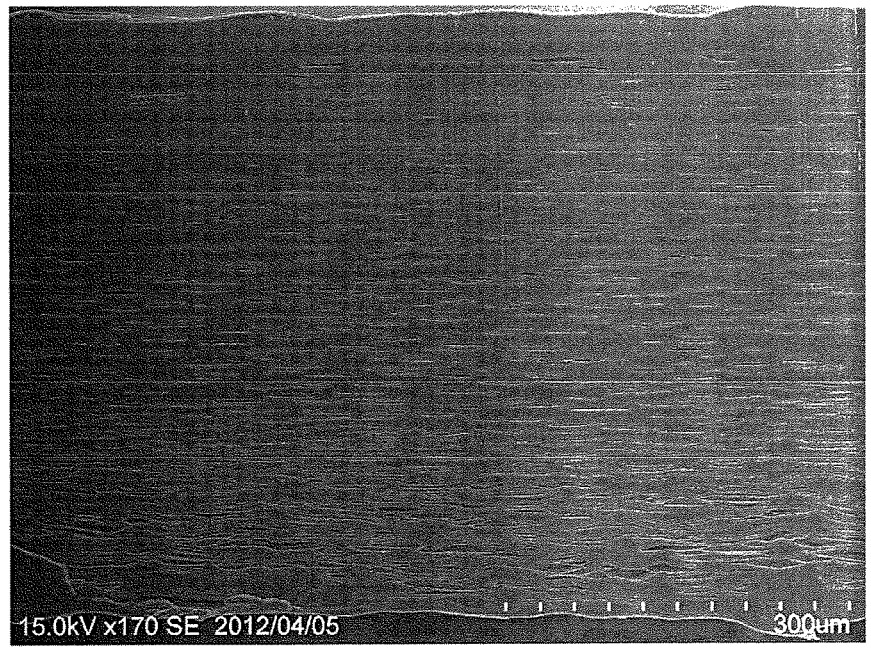
FIG. 10 is a SEM photograph of cross section of the body portion of the β-foamed and stretched bottle prepared in Experimental Example 6.

By using the SEM, the foamed bottle was observed on its cross section. FIG. 10 is a photograph thereof. As shown in FIG. 10, there had been formed a number of flat cells in the bottle wall. Further, the distribution of cell lengths was evaluated in the same manner as in Experimental Example 1. Upon dividing the cross section of the wall of the body portion into three in the direction of thickness, the average lengths of the foamed cells in the axial direction of the bottle were 19.46 μm in the outer layer, 28.76 μm in the core layer and 33.84 μm in the inner layer. Namely, there had been formed the foamed cells having such a gradational distribution that the foamed cells possessed the largest length in the axial direction of the bottle on the inner surface side and possessed the smallest length on the outer surface side. The skin layer on the outer surface side possessed an average thickness of 45.8 μm. The area ratio of bubbles in the outer layer was 3.85%. The average number of the cells was 36.2 in the direction of thickness.

The wall surface of the body portion of the foamed bottle was measured for its total light transmission factor at a wavelength of 500 nm in the same manner as in Experimental Example 1 to be 6.2% which was an excellent light-shielding property.

By using a digital variable angle glossimeter {UGV-5K manufactured by Suga Shikenki Co.}, the outer surface of the body portion of the foamed bottle was measured for its 20-degree specular gloss to be 47.3% which was a favorable mirror gloss.

Experimental Example 7

A gas-imbibing preform was formed under the same conditions as those in Experimental Example 6. Further, the core temperature and the quartz heater output were adjusted to increase the temperature differential between the inner surface and the outer surface, and the preform was heated while blowing the air onto the outer surface side to thereby form a foamed bottle. The temperature just before the blowing was 73° C. on the outer surface and 116° C. on the inner surface.

Figure 11:
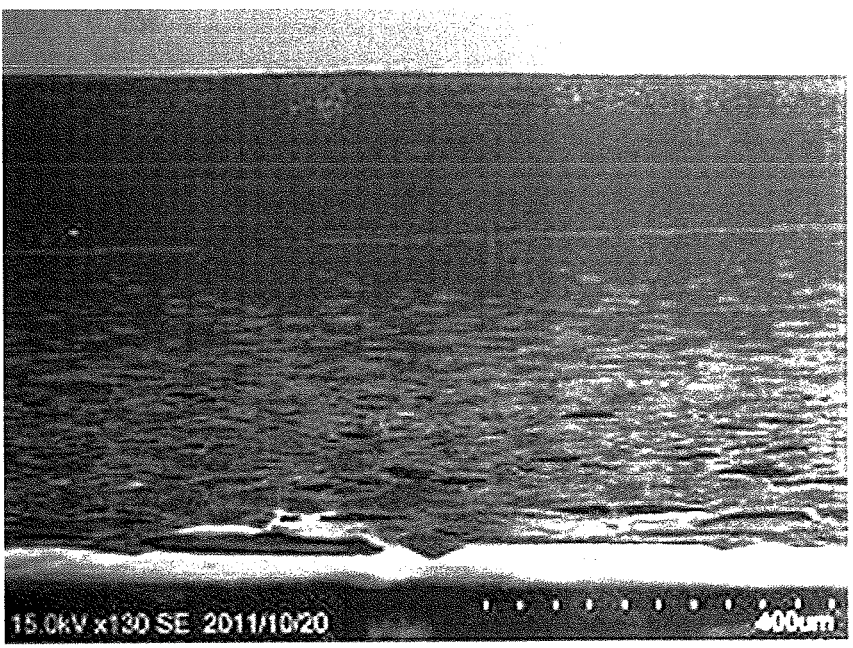
FIG. 11 is a SEM photograph of cross section of the body portion of the β-foamed and stretched bottle prepared in Experimental Example 7.

By using the SEM, the foamed bottle was observed in the same manner as in Experimental Example 6. FIG. 11 is a photograph thereof. As shown in FIG. 11, there had been formed a number of flat cells in the bottle wall, and it was confirmed that a thick skin layer had been formed on the outer surface side. The foamed cells possessed the average lengths in the axial direction of the bottle of 6.05 μm in the outer layer, 28.37 μm in the core layer and 50.71 μm in the inner layer. Namely, there had been formed the foamed cells having the same distribution of length as that of Experimental Example 6. The skin layer on the outer surface side possessed a thickness of 258.8 μm. The area ratio of bubbles in the outer layer was 0.07%. The average number of the cells was 19.2 in the direction of thickness. The total light transmission factor at a wavelength of 500 nm was 11.5% which was a favorable light-shielding property. The 20-degree specular gloss was 105% which was an excellent mirror gloss.

Experimental Example 8

A gas-imbibing preform was formed under the same conditions as those in Experimental Example 1. Further, the core temperature and the quartz heater output were adjusted to realize the same temperature differential between the inner surface and the outer surface as that in Experimental Example 7, and the preform was heated while blowing the air onto the outer surface side to thereby form a foamed bottle. The temperature just before the blowing was 74° C. on the outer surface and 114° C. on the inner surface.

By using the SEM, the foamed bottle was observed in the same manner as in Experimental Example 6 to confirm that there had been formed a number of flat cells in the bottle wall and that a thick skin layer had been formed on the outer surface side. The foamed cells possessed the average lengths in the axial direction of the bottle of 7.16 μm in the outer layer, 18.61 μm in the core layer and 29.97 μm in the inner layer. Namely, there had been formed the foamed cells having the same distribution of length as that of Experimental Example 6. The skin layer on the outer surface side possessed a thickness of 168.5 μm. The area ratio of bubbles in the outer layer was 0.51%. The average number of the cells was 22.0 in the direction of thickness. The total light transmission factor at a wavelength of 500 nm was 8.8% and the 20-degree specular gloss was 103%. Namely, both the light-shielding property and the mirror gloss were excellent.

Experimental Example 9

A gas-imbibing preform was formed under the same conditions as those in Experimental Example 6, and the core temperature and the quartz heater output were adjusted to realize the temperature differential between the inner surface and the outer surface nearly equal to, but opposite to, that of Experimental Example 6, to thereby form a foamed bottle. The temperature just before the blowing was 109° C. on the outer surface and 103° C. on the inner surface.

By using the SEM, the foamed bottle was observed in the same manner as in Experimental Example 6 to confirm that there had been formed a number of flat cells in the bottle wall. The average lengths of the foamed cells in the axial direction of the bottle were 35.15 μm in the outer layer, 24.02 μm in the core layer and 49.38 μm in the inner layer. Namely, there had been formed the foamed cells having such a length distribution that the lengths gradually decreased from the outer surface side toward the central portion and gradually increased again from the central portion toward the inner surface side. The skin layer on the outer surface side possessed a thickness of 13.8 μm. The area ratio of bubbles in the outer layer was 23.6%. The average number of the cells was 39.6 in the direction of thickness. The total light transmission factor at a wavelength of 500 nm was 5.8% and the 20-degree specular gloss was 16.3%. Namely, the light-shielding property was excellent but the mirror gloss was poor.

Experimental Example 10

A gas-imbibing preform was formed under the same conditions as those in Experimental Example 6, and from which a foamed bottle was formed under the same conditions as those in Experimental No. 7 but without blowing the air. The temperature just before the blowing was 110° C. on the outer surface and 118° C. on the inner surface.

By using the SEM, the foamed bottle was observed in the same manner as in Experimental Example 6 to find that there had been formed a number of flat cells in the bottle wall. The average lengths of the foamed cells in the axial direction of the bottle were 33.60 μm in the outer layer, 25.44 μm in the core layer and 34.87 μm in the inner layer. Namely, there had been formed the foamed cells having such a length distribution that the lengths gradually decreased from the outer surface side toward the central portion and gradually increased again from the central portion toward the inner surface side. The skin layer on the outer surface side possessed a thickness of 22.6 μm. The area ratio of bubbles in the outer layer was 23.15%. The average number of the cells was 42.2 in the direction of thickness. The total light transmission factor at a wavelength of 500 nm was 4.3% and the 20-degree specular gloss was 21.1%. Namely, the light-shielding property was excellent but the mirror gloss was poor.

Experimental Example 11

A gas-imbibing preform was formed under the same conditions as those in Experimental Example 8, and from which a foamed bottle was formed under the same conditions as those in Experimental No. 8 but without blowing the air. The temperature just before the blowing was 114° C. on the outer surface and 118° C. on the inner surface.

By using the SEM, the foamed bottle was observed in the same manner as in Experimental Example 6 to find that there had been formed a number of flat cells in the bottle wall. The average lengths of the foamed cells in the axial direction of the bottle were 26.11 μm in the outer layer, 19.44 μm in the core layer and 36.43 μm in the inner layer. Namely, there had been formed the foamed cells having such a length distribution that the lengths gradually decreased from the outer surface side toward the central portion and gradually increased again from the central portion toward the inner surface side. The skin layer on the outer surface side possessed a thickness of 14.0 μm. The area ratio of bubbles in the outer layer was 26.05%. The average number of the cells was 45.4 in the direction of thickness. The total light transmission factor at a wavelength of 500 nm was 4.5% and the 20-degree specular gloss was 16.1%. Namely, the light-shielding property was excellent but the mirror gloss was poor.

The results of Experimental Examples 6 to 11 were as shown in Table 2. Experimental Examples 9 to 11 are Comparative Examples from the standpoint of the β-foamed and stretched bottles of the invention but are Examples from the standpoint of the α-foamed and stretched bottles of the invention.

TABLE 2

| | Amount of gas fed (%) | Outer surface temp. (° C.) | Inner surface temp. (° C.) | Ave. cell size in the axial direction of the bottle (μm) | | | *1 | *2 | *3 | *4 |
|---|---|---|---|---|---|---|---|---|---|---|
| | | | | Outer layer | Core Layer | Inner layer | | | | |
| Ex. 6 | 0.13 | 100 | 113 | 19.46 | 28.76 | 33.84 | 3.85 | 45.8 | 6.2 | 47.3 |
| Ex. 7 | 0.13 | 73 | 116 | 6.049 | 28.37 | 50.71 | 0.07 | 258.8 | 11.5 | 105 |
| Ex. 8 | 0.15 | 74 | 114 | 7.157 | 18.61 | 29.97 | 0.51 | 168.5 | 8.8 | 103 |
| Ex. 9 | 0.13 | 109 | 103 | 35.15 | 24.02 | 49.38 | 23.60 | 13.8 | 5.8 | 16.3 |
| Ex. 10 | 0.13 | 110 | 118 | 33.6 | 25.44 | 34.87 | 23.15 | 22.6 | 4.3 | 21.1 |
| Ex. 11 | 0.15 | 114 | 118 | 26.11 | 19.44 | 36.43 | 26.05 | 14.0 | 4.5 | 16.1 |

*1: Area ratio of bubbles (%) in the outer layer
*2: Average thickness of skin layer on the outer layer side (μm)
*3: Light transmission factor (%)
*4: 20-Deg. specular gloss (%)

DESCRIPTION OF REFERENCE NUMERALS

1: foamed cells
10: body wall

The invention claimed is:
1. A foamed and stretched plastic bottle having a foamed region which is formed in a body portion and in which foamed cells are distributed, wherein said foamed region contains a portion, and in the portion, lengths of the foamed cells in an axial direction of the bottle are so distributed as to gradually decrease as positions of the foamed cells shift from an outer surface side of the body portion toward a central portion thereof and then gradually increase as their positions shift from the central portion thereof toward an inner surface side thereof.

2. The foamed and stretched plastic bottle according to claim 1, wherein as viewed in cross section in the axial direction of the bottle, the foamed cells occupy said portion at an area ratio of 5 to 50%.

3. The foamed and stretched plastic bottle according to claim 2, wherein total light transmission factor is not more than 10% in said portion.

* * * * *